Jan. 19, 1971  W. W. STOLL ET AL  3,555,800
CENTRIFUGAL HAY RAKE

Filed May 21, 1968  5 Sheets-Sheet 1

INVENTORS
WALTER W. STOLL
HANS HÖFFLINGER
JOSEF HEINEN
FLORENS COESTER
ALBRECHT ZÜHLSDORFF

BY
*Amirie & Smiley*
ATTORNEYS

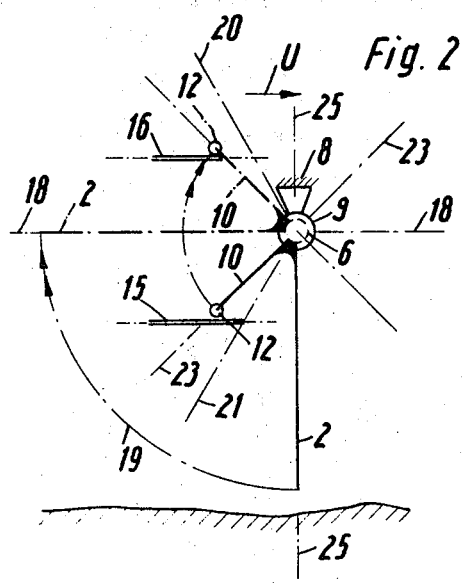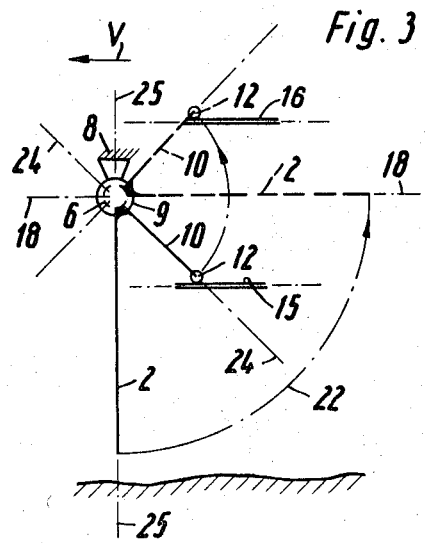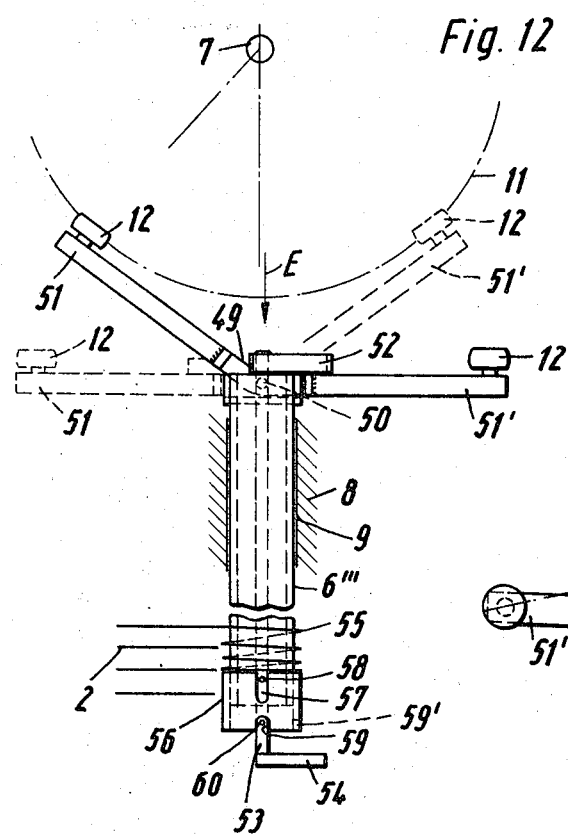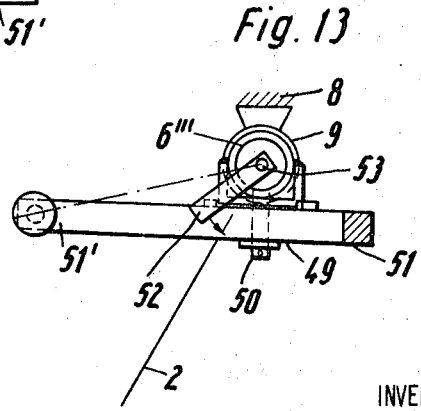

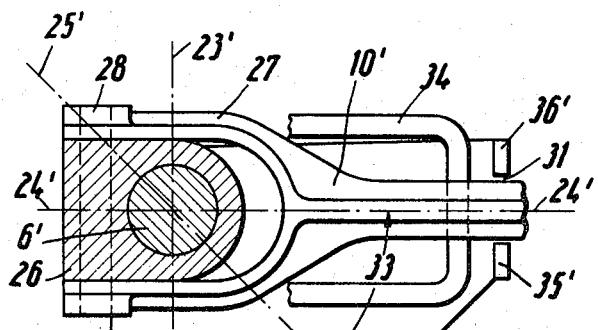
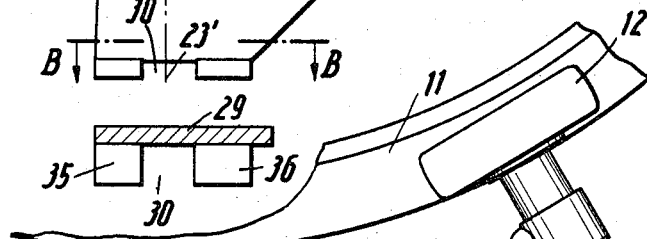
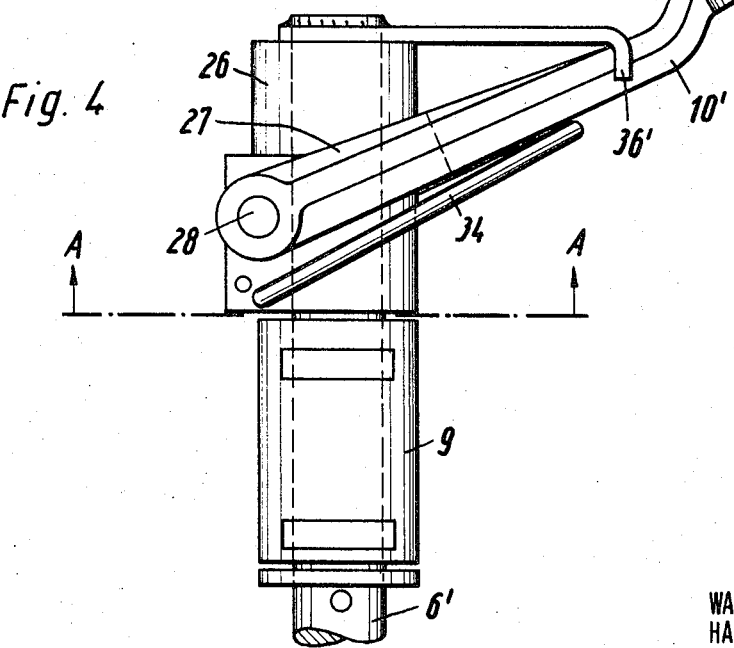

INVENTORS
WALTER W. STOLL
HANS HÖFFLINGER
JOSEF HEINEN
FLORENS COESTER
ALBRECHT ZÜHLSDORFF

BY

*Amirie & Smiley*
ATTORNEYS

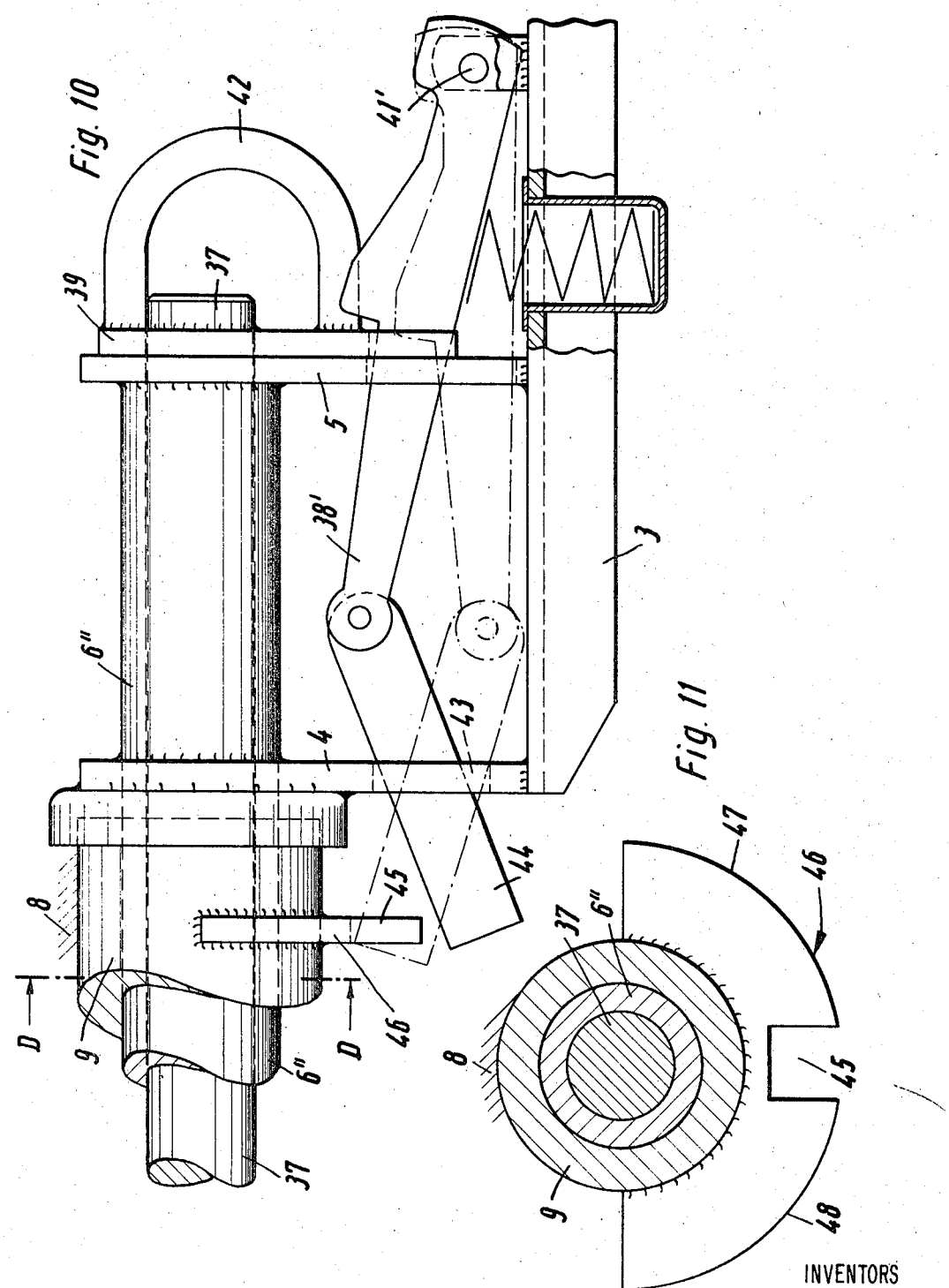

United States Patent Office 3,555,800
Patented Jan. 19, 1971

---

3,555,800
CENTRIFUGAL HAY RAKE
Walter W. Stoll, 12 Akazienstrasse, 315 Peine, Niedersachsen, Germany, and Hans Hofflinger, Peine, Niedersachsen, Josef Heinen, Broistedt-Rosenhagen, Niedersachsen, Florens Coester, Hannover-Ricklingen, Niedersachsen, and Albrecht Zuhlsdorff, Lengede, Niedersachsen, Germany; said Hofflinger, Heinen, Coester, and Zuhlsdorff assignors to said Stoll
Filed May 21, 1968, Ser. No. 730,750
Claims priority, application Germany, May 22, 1967, St 26,908; Austria, May 19, 1968, A 2,708/68
Int. Cl. A01d 79/02
U.S. Cl. 56—370         7 Claims

ABSTRACT OF THE DISCLOSURE

The tine oscillating mechanism of a centrifugal hay rake oscillates the tines through an angle not exceeding about 90 degrees, and the carrier which sweeps the tines in a circular path parallel to the ground may be rotated in either direction. The cam follower mechanism is adapted to be altered for the opposite rotational directions of the carrier so that the full oscillation of the tines is used in raking and the tines always sweep backward with respect to the circular motion imparted to them by the carrier.

BACKGROUND OF THE INVENTION

Centrifugal hay rakes ordinarily are constructed in such fashion that the cylindrical cam which causes the oscillation of the tines in response to rotation of the carrier assembly about a vertical axis causes oscillation of the tine actuating shaft or shafts through some predetermined angular measure, only half of which angular rotation of the shaft is utilized in the raking action for the reason that it is desirable to utilize relatively opposite rotational motions on the carrier to allow the hay to be raked to one side or the other, as desired.

Practical considerations in building such centrifugal hay rakes dictate the necessity for limiting the angular oscillation of the actuating shaft or shafts to not more than about 120 degrees. The reason for this is that in order to maintain bearing pressures between the cam track and the cam follower at reasonable levels, the cam follower lever should not include at any time an angle, with respect to a line perpendicular to the surface of the cam track with which the cam follower is engaged, that is less than about 30 degrees. If such an arrangement is utilized in a hay rake in which the reversible rotation of the carrier is utilized, the inevitable result is that the operative sweep of the tines is limited to a maximum of about 60 degrees (one-half of the total sweep of 120 degrees), which is less than that which will impart a really efficient raking action to the hay. In order to impart sufficient raking action, the sweep of the tines should be at least about 75 degrees and, preferably in the order of 90 degrees, which means that with prior art constructions the bearing pressures between the cam follower and the track must become excessively heavy in order to achieve the greater angles of sweep (i.e. 150 degrees total sweep for 75 degrees of effective sweep).

BRIEF SUMMARY OF THE INVENTION

This invention relates to a centrifugal hay rake which is adapted for rotation in relatively opposite directions for raking the hay to one side or the other, as desired, in which the whole oscillatory motions of the tine actuating shaft or shafts is used regardless of the direction of rotation of the carrier. To achieve this end, the cam follower lever mechanism extending between the actuating shaft and the cam track includes mechanism whereby the direction of oscillation of the shaft may be controlled to sweep in a directional sense which is backward with respect to the circular motion imparted to the shafts and the tines carried by them as imparted by the carriage mechanism.

To accomplish the above results, the cam follower lever connection operating between the stationary cam and the tine actuating shaft carried by the rotary carriage is constructed so as to be altered as to its disposition relative to the cam, depended upon the direction of rotation of the carriage. Thus, the cam follower lever connection will always be in a leading or trailing relationship with respect to the tine actuating shaft relative to the direction of rotation imparted to the shaft by the carriage mechanism and in this way the full oscillatory motion imported to the shaft is used in the raking action of the tines and the raking motion will always be in the proper direction with respect to the direction of movement imparted to the tines by the carriage mechanism. In this way, the bearing pressures exerted between the cam and the cam follower may be maintained at reasonable levels and the entire mechanism may be constructed in more compact and efficient manner as contrasted to prior art configuration wherein only that half of the total oscillatory motion of the actuating shaft is utilized dependent upon the direction of rotation of the carriage.

BRIEF DESCRIPTION OF THE FIGURES OF THE DRAWING

FIGS. 2 and 3 are schematic illustrations showing certain principles according to the present invention;

FIG. 4 is an enlarged plan view showing one form of cam follower lever interconnection between the cam and the tine actuating shaft;

FIG. 5 is a transverse section taken substantially along the plane of section line A—A of FIG. 4;

FIG. 6 is a sectional view taken substantially along the plane of section line B—B in FIG. 5;

FIG. 10 is an enlarged elevation view showing a further modified form of the invention;

FIG. 11 is a transverse section taken substantially along the plane of section line D—D in FIG. 10;

FIG. 12 is a plan view showing a still further modified form of the invention;

FIG. 13 is an elevational view taken in the direction of the arrow E in FIG. 12;

DETAILED DESCRIPTION OF THE INVENTION

Figure 1:
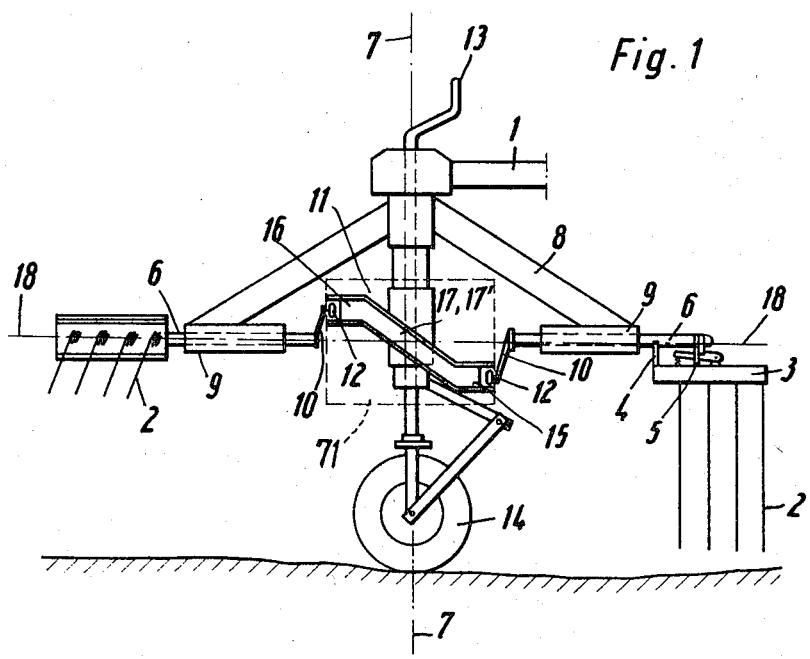
FIG. 1 is a side elevational view of one embodiment of the present invention.

With reference now more particularly to FIG. 1, the mechanism as shown therein illustrates the general arrangement of a rotary hay rake in which the frame thereof is supported by a suitable ground engaging wheel 14, which is vertically adjustable along the axis 7 to raise and lower the frame proper with respect to the ground surface as will be understood by those skilled in the art by the simple expedient of rotating the crank handle 13 which by means of a threaded connection with the frame is effective to raise and lower the wheel with respect thereto. The upper end of the frame includes a gear box mechanism to which a suitable power take-off connection 1 from an associated tractor (not shown) is drivingly engaged so as to effect relatively opposite rotary motions to a carriage assembly having its hub journalled on the frame and provided with radially projecting arms 8 which mount horizontally disposed bearings 9 within which tine actuating shafts 6 are rotatively received. It will be understood, of course, that any suitable hitch mechanism (not shown) may be used to couple the rake to the associated tractor. The frame also carries a stationary cylindrical cam member 11 which presents a continuous cam track having a lower dwell portion 15, an upper dwell portion 16 and, at opposite sides, the ascending and descending ramp portions 17, 17'. Cam follower levers 10 are connected to the inner ends of the shaft 6 and may be provided with roller followers 12 which engage within the cam track and are adapted to impart oscillatory motions to the shaft 6 in response to rotation of the carriage about the axis 7 which coincides with the longitudinal axis of the cylindrical cam. The shafts 6 carry tine assemblies 2 at their outer ends which depend or project laterally from a carrier plate 3 fixed to the shaft 6 by means of suitable brackets 4 and 5. It will be appreciated then that as the shafts 6 are revolved by the power take-off 1 within the horizontal plane 18 the cooperation of the arms 10, followers 12 and the cam member 11 imparts oscillatory motions to the shafts 6 and their tine assemblies 2.

With reference to the diagrammatic illustration of FIG. 2, certain principles of the present invention will be understood therefrom. In FIG. 2, the lower and upper dwell portions 15 and 16 of the cylindrical cam are illustrated and the positions of the cam follower levers 10 while engaged respectively with the lower and upper dwell portions are shown in full and broken lines respectively. In order to maintain the bearing pressures between the followers 12 and the cam tracks at reasonable levels, it is of concern to maintain at all times the angle included between the cam follower levers 10 and a line perpendicular to the contact surface of the cam tracks and the followers 12 of a magnitude of at least about 30 degrees. Thus, the maximum oscillatory angular movement which may be imparted to the shafts 6 is limited, under these considerations, to a maximum of 120 degrees which is illustrated by lines 20 and 21 in FIG. 2. If the direction of horizontal motion imparted to the shaft 6 by the carriage assembly is in the direction of the arrow U in FIG. 2, and with the cam follower levers 10 in the trailing position as shown in FIG. 2, the tines 2 will move from a depending position shown in full line in FIG. 2 when the follower 12 is engaged on the lower dwell portion 15 to an upwardly swept position reached when the follower 12 is on the upper dwell portion 16, this latter position of the tines being indicated in broken line. Since the total arc of the swept motion imparted to the tines need not be greater than about 90 degrees and is preferably between 75 and 90 degrees for most efficient raking action, the included angles as aforesaid may be, as shown in FIG. 2, exactly 45 degrees, which will produce a full 90 degree sweep. It is important to note also that the direction of the sweeping motion imparted to the tines from the full to the broken line position in FIG. 2 is in a backward sense with respect to the motion imparted to the shaft 6 as indicated by the arrow U and this is a further important consideration required to achieve proper disengagement of the hay from the tines as they are moved from their depending positions to their upwardly swept positions.

If it is now visualized in FIG. 2 that the direction of motion U is reversed, as may be desired in order to alter the sweeping of hay from one side to the other, it will be apparent that the upwardly sweeping motion of the tines 2 will remain in the same direction as indicated by the arrow 19 in FIG. 2 for the carriage movement direction U. Thus, the sweeping motion will now be in the direction of the motion imparted to the shafts 6 by the rotary carriage and, under these circumstances, inefficient discharge of the hay from the tines occurs. It is for this reason that prior art devices have utilized the maximum angular sweep as indicated by lines 20–21 in FIG. 2, so that by using one-half of the total sweep for one direction of rotation of the carriage and the other half for the opposite direction of rotation of the carriage, the relative sweeping motion of the tines will always be correct. That is to say, the cam follower lever 10 is oriented with respect to the tines 2 such that when the cam follower lever 10 is midway between the positions of the lines 20 and 21, the tines 2 will be in their vertical or depending positions or, as stated in another way, normal actuation has been to sweep the tines through an angle of a maximum of 120 degrees, 60 degrees on either side of the vertical disposition of the tines 2. As a result, only a 60 degree sweep of the tines is effected which does not lead to efficient discharge of the hay from the tines.

The manner in which this disadvantage is overcome with respect to the present invention will be realized from a study of FIGS. 2 and 3 simultaneously. In FIG. 3, the direction of motion imparted to the shaft 6 is indicated by the arrow V which is opposite to the motion U of FIG. 2. It will be noted, from FIGS. 2 and 3, that the cam follower levers 10 have been mirror-image reversed as between FIGS. 2 and 3 so that the sweeping motion of the tines as indicated by the arrow 22 is in the proper direction with respect to the motion V.

One manner in which this may be accomplished is shown in FIGS. 4–6. As may be seen best in FIG. 4, the actuating shaft 6' is provided with a mounting block 26 which rotates therewith and which is provided with a trunnion pin 28 rotatively receiving the bifurcated end 27 of the cam follower lever 10'. The block 26 also mounts a spring member 34 which normally urges, as may be seen in FIG. 4, the cam follower lever 10' into engagement with a plate 29 which is rigidly affixed to the inner end of the shaft 6'. The plate 29 is provided with two pairs of latterly projecting ears 35 and 36, and 35' and 36' presenting notches 30 and 31 for selectively receiving the cam follower lever 10'. As was the case in connection with FIGS. 2 and 3 wherein the cam follower lever 10 is moved from one side to the other side of the plane 25—25 containing the axis of the shaft 6 and the tines 2 as indicated by the lines 23—23 and 24—24, the assembly of FIG. 5 likewise allows the cam follower lever 10' to be so moved with respect to the plane 25'—25' as shown by the arcs 32, 33 for disposition along either the line 23'—23' or the line 24'—24'.

Figure 7:
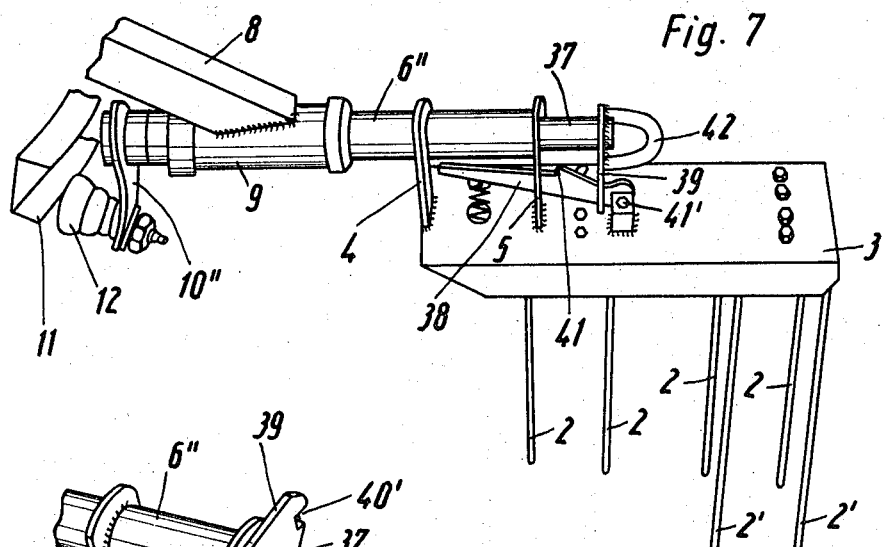
FIG. 7 is a perspective view showing a modified form of the invention.
Figure 8:
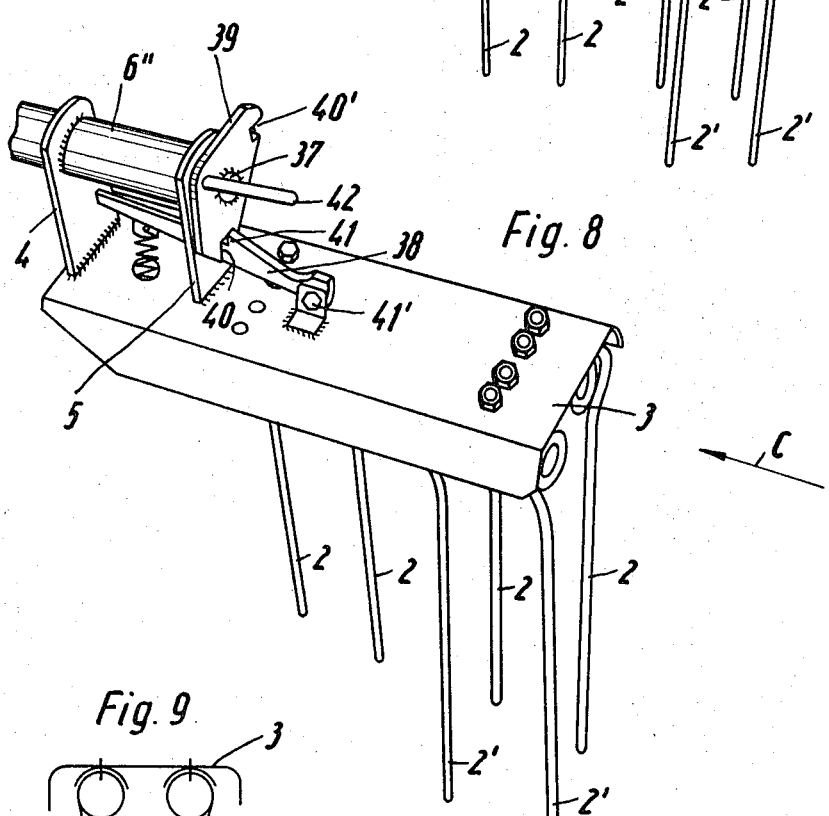
FIG. 8 is a perspective view of the assembly shown in FIG. 7.

In the modification according to FIGS. 7 and 8, the cam follower lever 10" as affixed to the inner end of a shaft 37 which is rotatably and slidably received within the shaft 6", the latter of which carries the tine assembly as shown. The outer end of the shaft 37 caries a plate 39 having a hand-grip member 42 thereon and is provided with the spaced notches 40 and 40'. The tine-carrying plate 3 is provided with a pivotal connection 41' to an arm 38 having an intermediate portion thereof engaged within either one of the notches 40 or 40' and having its free end normally urged upwardly under the action of a suitable spring. A locking tang 41 on the arm 38 normally prevents axial withdrawal of shaft 37 but when the arm 38 is depressed, the shaft 37 may be withdrawn through the medium of the hand-grip device 42 to remove the cam roller 12 from within the confines of the cam track 11 whereinafter the shaft is rotated to the desired position and the arm 38 released to engage in either the notch 40 or 40' after the shaft has been pushed home to reengage the cam follower 12 in the cam track in the new position.

FIGS. 10 and 11 show a further modification of the assembly generally shown in FIGS. 7 and 8 wherein the bearing sleeve 9 is provided with a depending flange member 46 presenting a slot 45 with the inner end of the arm 38′ being provided with a link member 44 which, when the arm 38′ is depressed, and by virtue of the projection of the link 44 through the opening 43 in the plate 4, serves to elevate the free end of the link 44 to reside within the slot 45 and prevent the quill shaft 6″ and its tine assembly from rotating with respect to the bearing sleeve. 9. The flange 46 is provided with arcuate edges 47 and 48 normally clearing the free end of the link 44 when the parts are in the position shown in full line in FIG. 10.

A further type of assembly which may be utilized is illustrated in FIGS. 12 and 13. In this embodiment, a shallow V-shaped arm assembly is pivotally mounted by suitable trunnions 50 to the inner end of the shaft 6‴ and presents the limbs 51 and 51′ each of which carries a cam follower 12. The shaft 53 projects axially through the shaft 6‴ and is provided with a hand crank portion 54 at its outer end and at its inner end it carries a cam finger 52 which, when the shaft is rotated, is adapted to dispose one or the other of the limbs 51, 51′ in operative position as shown in full and broken lines in FIG. 12. The tines 2 are carried by a housing member 56 which is provided with an elongate notch 57 within which a pin 58 on the shaft 6‴ rides, the housing 56 normally being urged outwardly as shown in FIG. 12 under the action of a spring 55 and this action also serving to lock the shaft 53 to the housing 56, the shaft 53 carrying a pin 60 received in the notch 59 of the housing 56 for this purpose. By depressing the housing 56 axially inwardly, the pin 60 clears the slot 59 and the shaft 53 may be rotated.

Figures 14, 15:
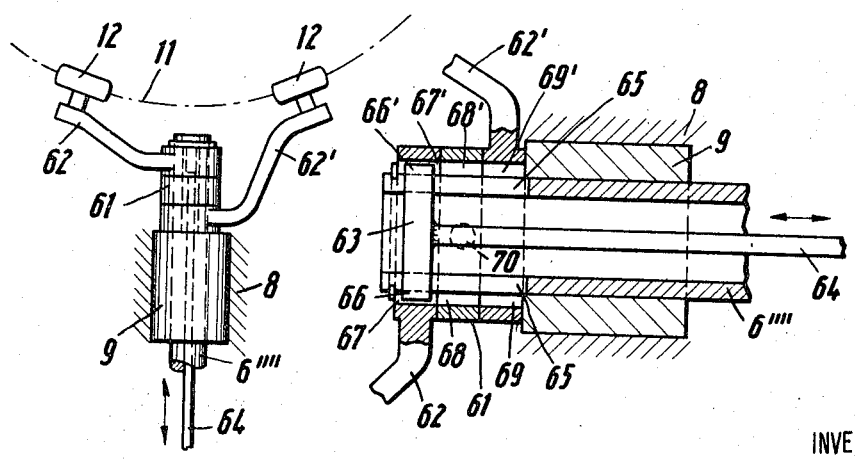
FIG. 14 is a plan view showing a further modified form of the invention.
FIG. 15 is a longitudinal section taken through the assembly of FIG. 14.

The embodiment shown in FIGS. 14 and 15 employs a pair of cam follower levers 62 and 62′ both carrying cam followers 12 which constantly remain in engagement with the cam track 11. In the case of this embodiment, however, means is provided for selectively clutching one or the other of the levers 62 or 62′ to the tine actuating shaft 6‴. For this purpose, as may be seen best in FIG. 15, the inner end of the shaft 6‴ is provided with diametrically opposed slots 65 within which a crossbar member 63 is slidably received and which is connected to the inner end of an actuating or control shaft 64. The hubs of the levers 62 and 62′ are journaled on the inner end of the shaft 6⁗ and are provided with diametrically opposed recesses 67, 67′ and 69, 69′. A spacer member 61 is interposed between these hubs and is similarly provided with diametrically opposed slots 68 and 68′ registering with the respective slots 67, 69 and 67′, 69′, substantially as is shown in FIG. 15 whereby movement of the shaft 64 will carry the cross-piece member 63 into alignment with the proper cam lever hub to couple it to the shaft 6⁗. To retain the spacer 61 in proper registry with the two hubs of the levers 62 and 62′, the spacer is secured to the shaft 6⁗ against rotation relative thereto by means of a suitable set screw 70.

Figure 9:
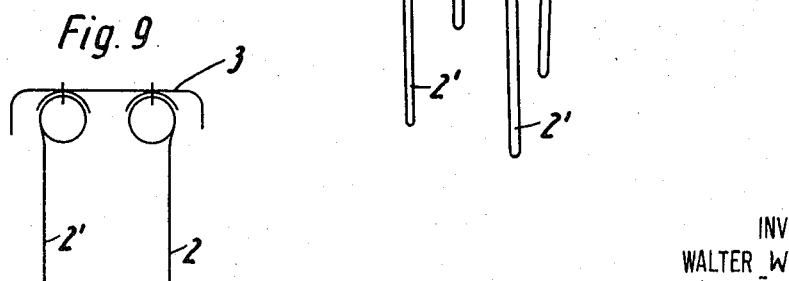
FIG. 9 is an end elevation taken in the direction of the arrow C in FIG. 8 showing the relative dispositions of the preferred configuration of the tines.

FIG. 9 illustrates a further feature of the present invention wherein it will be seen that the carrier plate 3 for the tines includes two rows of tines 2, 2′ having their coil wound connections to the plate 3 wound in opposite directions. With this arrangement, for one direction of rotation of the carrier assembly, one row of tines will effect the raking action while the other row of tines will effect the raking action for the opposite direction of movement of the carrier assembly. In this way, and in view of the fact that the coil wound conncetions are wound correctly for the relative directions of rotation of the carrier, the life of the tine assembly is materially increased.

Aside from the advantages previously mentioned, it will be understood that since the full oscillations of the shafts 6 are used in the raking action, the total angle of oscillation is reduced so that the cam follower levers may be made of shorter length than was heretofore possible without imposing inordinate bearing pressures upon the assembly. Consequently, the cam and carriage, as well as the levers, may be made in more compact form than was possible previously.

By inspection of the drawing figures, it will be obvious that, through error during adjustment for delivery from one side to the other, the rollers 12 may not engage within the trackway, but could become lodged above or below the trackway. Such a condition could result in damage to the machinery. To avoid this contingency the trackway structure may be provided with a cylindrical fairing above and below the trackway, as indicated at 71 in FIG. 1, which fairing would be of a diameter equal to the outer diameter of the trackway structure and extends above and below it, as shown, having an overall height at least twice the length of the levers 10.

What is claimed is:
1. A rotary hay rake comprising, in combination,
   a frame adapted for travel over the ground,
   a cylindrical cam carried by said frame with its longitudinal axis substantially vertically disposed and having a continuous cam track including ascending and descending ramp positions,
   a carrier rotatably mounted on said frame coaxially of said cam,
   means for rotating said carrier selectively in clockwise and counterclockwise directions,
   a substantially horizontal actuating shaft rotatably mounted in said carrier,
   cam follower means engaging said cam track and connected to said shaft for oscillating the shaft back and forth through a predetermined angular measure in response to every complete revolution of said carrier,
   tine means connected to said shaft for oscillation therewith between a depending, hay-engaging position at one extreme of the oscillatory motion of said shaft and an upwardly swept position at the other extreme of said oscillatory motion of the shaft,
   said cam follower means including a mechanism for moving said tine means from its depending position to its upwardly swept position in a directional sense opposite to that direction of movement imparted to the tine means by said carrier irrespective of the direction of rotation of said carrier,
   said actuating shaft being radially disposed with respect to the axis of said cylindrical cam and positioned midway between the upper and lower extremities of said cam track, and
   said cam follower means including a lever and said mechanism comprising a latch for selectively coupling said lever in one of two rotational positions to said shaft.

2. The rotary hay rake according to claim 1 wherein said latch is a plate fixed to the inner end of said shaft and having a pair of notches therein, said lever being trunnioned on said shaft for swinging movement out of engagement with said cam track and said notches, and spring means normally urging said lever into engagement with said track and said plate.

3. The rotary hay rake according to claim 1 wherein a second shaft is slidably and rotatably carried by said actuating shaft, said lever being connected to the inner end of said second shaft, said latch comprising a plate fixed to the outer end of said second shaft and having a pair of spaced notches therein, an arm pivotally connected to said actuating shaft for reception within said notches, and spring means normally urging said arm toward said plate.

4. The rotary hay rake according to claim 3 including a notched flange on said carrier, said arm having a link pivoted thereto for reception within the notch in said flange when the arm is moved away from said plate.

5. The rotary hay rake according to claim 1 including a second lever, both levers being journalled in said actuating shaft, and said latch comprising a member for selectively coupling said levers to said actuating shaft.

6. The rotary hay rake according to claim 1 wherein said lever is pivotally connected to said shaft and includes two limbs separately engageable with said cam track, said latch comprising a cam finger for rotating said lever.

7. A rotary hay rake as defined in claim 1, in which the cam track is provided with a cylindrical fairing above and below said cam track coaxial with said cam, said fairing having a diameter the same as the outer diameter of the cam and a height at least equal to twice the length of said lever.

References Cited

UNITED STATES PATENTS

| 84,257 | 11/1868 | Burt et al. | 56—370 |
| 458,093 | 8/1891 | Boals | 56—370 |

FOREIGN PATENTS

| 450,793 | 4/1968 | Switzerland | 56—370 |
| 458,822 | 8/1968 | Switzerland | 56—370 |
| 458,823 | 8/1968 | Switzerland | 56—370 |
| 459,641 | 9/1968 | Switzerland | 56—370 |

LOUIS G. MANCENE, Primary Examiner

J. A. OLIFF, Assistant Examiner